E. B. Bigelow.
Jacquard Motion for Loom.

Nº 2,653.  Patented May 30, 1842.

E. B. Bigelow.
Jacquard Motioin for Loom.

No. 2,653.

Sheet 2-5 Sheets.

Patented May 30, 1842.

E. B. Bigelow.
Jacquard Motion for Loom.

N° 2,653.                               Patented May 30, 1842.

E. B. Bigelow.
Jacquard Motion for Loom.
N°. 2,653. Patented May 30, 1842.
Sheet 4-5 Sheets.
Fig. 8.
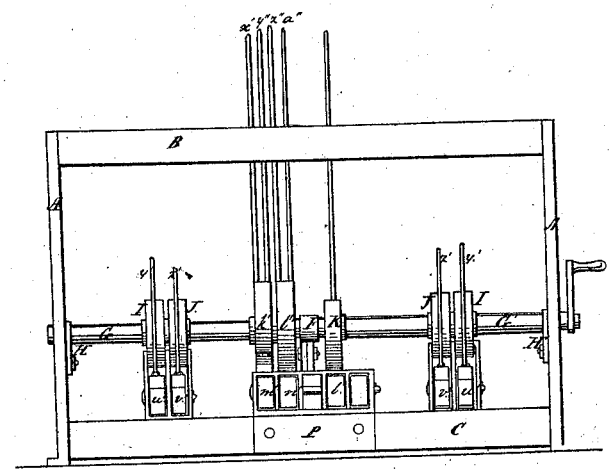
Fig. 10.
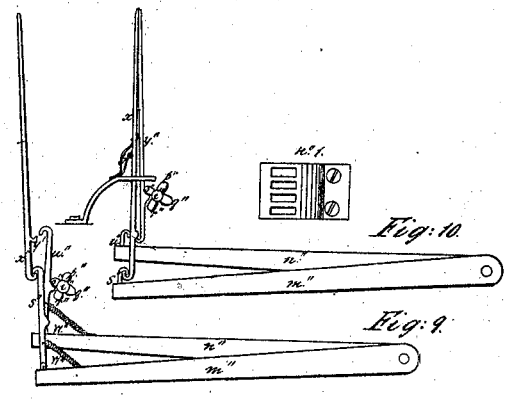
Fig. 9.
Fig. 11.
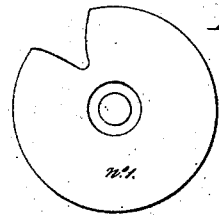
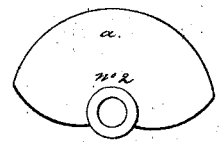
Fig. 14.
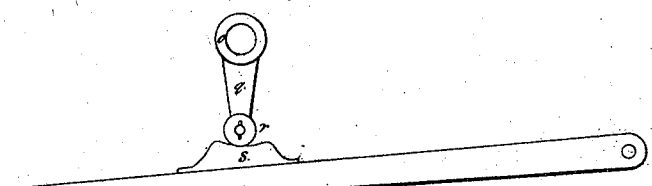
Fig. 15.
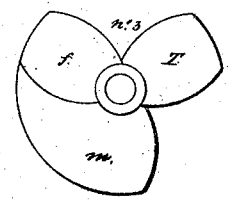

E. B. Bigelow.
Jacquard Motion for Loom.

No. 2,653.  Patented May 30, 1842.

Sheet 5-5 Sheets.

UNITED STATES PATENT OFFICE.

ERASTUS B. BIGELOW, OF LANCASTER, MASSACHUSETTS.

MANNER OF MOUNTING LOOMS FOR WEAVING COUNTERPANES AND OTHER ARTICLES.

Specification of Letters Patent No. 2,653, dated May 30, 1842; Antedated May 1, 1842.

*To all whom it may concern:*

Be it known that I, ERASTUS B. BIGELOW, of Lancaster, in the county of Worcester and State of Massachusetts, have invented certain improvements in the manner of mounting the harness and working the same in the loom for weaving figured fabrics, such as are commonly known under the names of "Imperial," or "French" quilts and "Imperial petticoat robes," the said improvements being made on the loom for weaving counterpanes and which may be applied to the weaving of other articles, for which loom Letters Patent of the United States were granted to me, dated the 24th day of April, 1840; and I do hereby declare that the following is a full and exact description of the improvements thereon by which it is particularly adapted to the above purpose.

Figure 1:
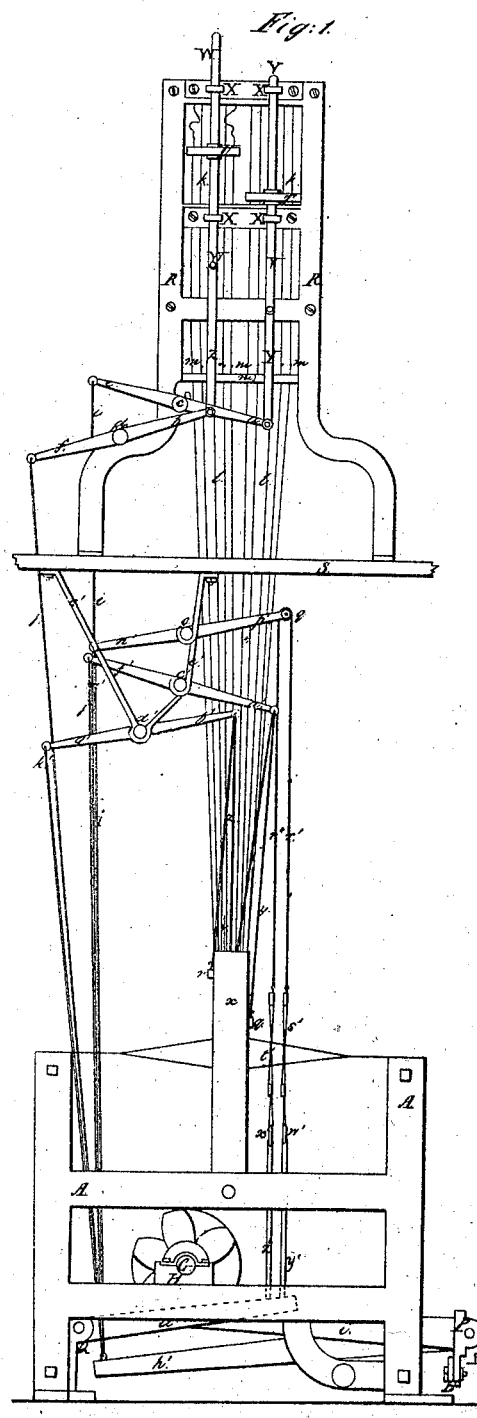
Figure 2:
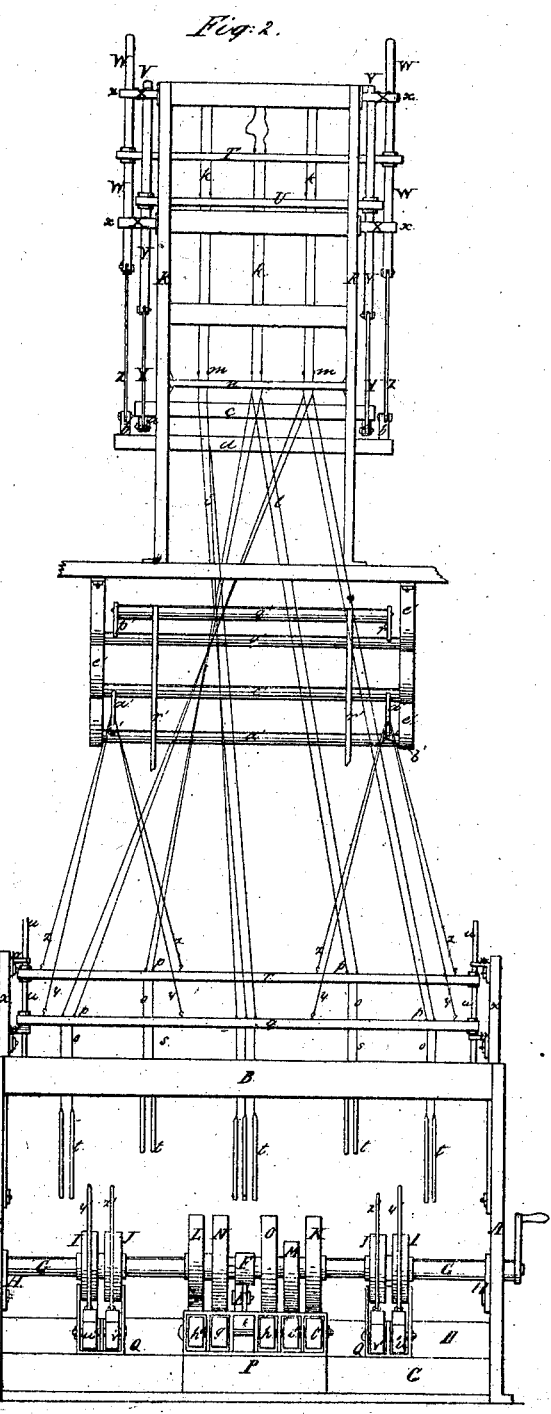

In the accompanying drawings, Figure 1, in sheet A, is an end view of my improved loom under one of its modifications, and Fig. 2, a front view thereof; the other figures represent certain parts in detail, to be presently explained.

In each of the figures where the same parts are represented, they are designated by the same letters of reference.

A, A, is the frame work of the end of the loom. B, is the breast beam. C, the front bottom girth. D, the bottom back girth. E, a middle girth, upon which is affixed the box F, which constitutes the middle bearing of the revolving cam shaft G. The end boxes, or bearings, of this shaft are shown at H, H.

Figure 3:
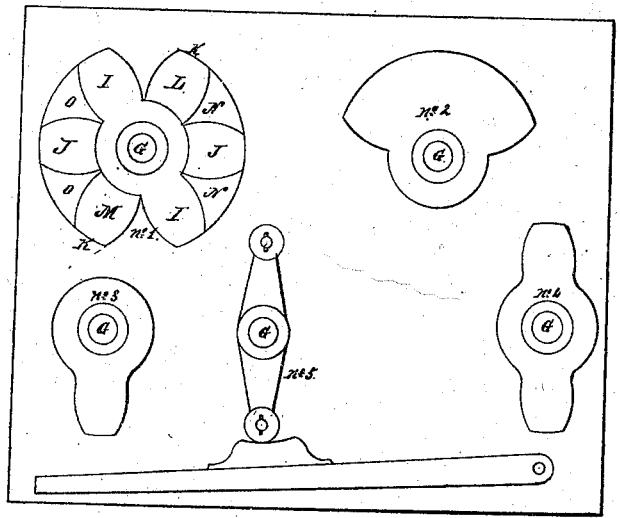

In No. 1, Fig. 3, the respective cams are shown as seen when looking along the cam shaft endwise. The cams I, I—J, J, and K, have each two swells, or are double cams; each swell of these cams acts during the introduction of one thread of woof, or filling; these cams may each have the form represented by No. 4, Fig. 3. The swells of the cam K, correspond in form with those marked L, and M, as shown in the end view No. 1, Fig. 3. These latter cams, L, and M, have each one swell only, as shown by No. 3, Fig. 3; each of these acts during the time of introducing one thread of filling.

The cams N, and O, have each one swell, or acting part, of such extent as to act during the time of introducing three threads of woof, or filling; the form of these cams is shown at No. 2, Fig. 3; and they are seen in part at N, N, O, O, No. 1, Fig. 3.

P, is the front treadle hanger, which may be bolted to the middle cross girth E. The two back treadle hangers Q, Q, I bolt to the back girth D. The jacquard machine R, R, is shown as resting on the floor S, S, above the loom. This machine is furnished with two trap-boards T, and U, which trap boards are guided by the rods V, V, and W, W, said rods sliding vertically in the stands X, X, which are bolted to the frame-work of the machine.

Y, Y, and Z, Z, are connecting, or lifting, rods, by which motion is communicated to the rods V, and W, by the vibration of the vibrating levers $a$, $a$, and $b$, $b$, which levers are attached to the shafts $c$, and $d$, extending from side to side of the machine, and vibrating on suitable bearings. The opposite arms $e$, and $f$, on the same shafts $c$, and $d$, shown in Fig. 1, are connected to the treadles $g$, and $h$, by their respective cords, or wires, $i$, and $j$.

The polygon, or prism, which carries the pattern card of the jacquard machine is peculiar in its construction, and is described and claimed in the specification of an improved loom for weaving ingrain, and other, carpets; for which loom I have obtained Letters Patent of the United States, dated on the first day of May, 1842; and to the specification of which I now refer, for the manner of constructing and arranging the said polygon, or prism. By this arrangement, one of the trap-boards is allowed to descend while the other rises, without disturbing the action of the knot cords; and I thereby counteract the unequal action of the harness weights upon the cams by which they are raised.

The knot cords $k$, $k$, are tied at $m$, $m$, to the neck of the harness $l$, $l$; and the threads of the harness pass down through the heck-frame $n$, and are tied to the male cords $o$, $o$, by knots at $p$, $p$, which knots are of a size sufficient to prevent their entering the holes in the journals, or harness boards, $q$ and $r$; thereby causing the said journals, or harness boards, when raised, to lift the males $s$, $s$, and their weights $t$, $t$, $t$.

The journals, or harness boards, $q$, and $r$, are movable up and down, this motion of the harness boards being a distinguishing feature in my improvement, and there are smooth holes, of a suitable size to allow the male cords $o$, $o$, to pass freely through them; these journals are supported by the guide rods $u$, $u$, which slide up and down in the stands $w, w$, which are bolted to the stands $x, x$, that make a part of the end framework A, A, of the loom. The wires, or cords, $y, y, y$, and $z, z, z$, are those which serve to connect the journals $q$, and $r$, with their respective vibrating levers $a', a'$, and $b', b'$. These levers project from their fulcrum shafts $c', d'$, which shafts vibrate in the hangers $e', e'$; said hangers being bolted to the flooring S. One of each of the arms $a'$, and $b'$, is shown in the end view Fig. 1, and also the two arms $f'$, and $g'$, which vibrate on the same shafts $c'$, and $d'$; these latter arms are connected to the treadles $h'$, and $i'$ by the rods $j'$, and $k'$.

Above the fulcrum shafts $d', c'$, is a third fulcrum shaft $o'$, seen also in the end view Fig. 1, carrying the arms $n'$, and $p'$. The rod $m'$, connects the treadle $l'$, shown in Fig. 6, to the vibrating arm $n'$; this shaft turns, also, in the hanger $e', e'$. The arms $p', p'$, which are on the opposite side of the shaft $o'$, to that marked $n'$, carry the roller $q'$, around which roller pass the straps $r', r'$, which connect with, and support, the leaves of harness, or heddles, $s'$, and $t'$; the straps $r', r'$, are shown as cut off in Fig. 2, and the back portion of that shown in Fig. 1, is marked $r''$. These heddles are connected to the treadles $u', u'$, and $v', v'$, respectively, by the jacks $w'$, and $x'$, and by the straps $y'$, and $z'$. The leaves of heddles, or harness, $s'$, and $t'$, are such as are in common use.

There are, under this arrangement, six principal motions concerned in the working of the harness and its appendages. The first is the working of the trap-board T, and is as follows. The cam N, acts on the treadle $g$, and this through the medium of the rod $i$, and the vibrating lever $e, a$, Fig. 1, raises the connecting rod Y, and the rod V, and, consequently, the trap-board T, which is attached to it. This board falls by the gravity of its connecting parts when the cam N, ceases its action on the treadle $g$.

The second motion is that by which the trap board U, is worked; this is effected in the following manner. The cam O, forces down the treadle $h$, and this being connected to the vibrating lever $f, b$, by the rod $j$, lifts the connecting rods, Z, Z, and the guide rods W, W, which raises the trap-board U, and this falls when the cam O, ceases its action on the treadle $h$.

The third motion is that of working the journal, or harness board $q$, and is effected as follows. The cam L, depresses the treadle $h'$, and this being connected to the vibrating levers $a' f'$, by the rod $j'$, and these to the journal $q$, by the wires $y, y$, raise it, and when the cam L, is relieved from its action on the treadle $h'$, the journal falls by its own gravity.

The fourth motion is that of working the journal, or harness-board $r$, which is effected in the following manner. The cam M, depresses the treadle $i'$, which is connected to the vibrating levers $g', b'$, by the rod $k'$, and these by the cords, or straps, $z, z$, to the journal board $r$; which board is consequently raised by the action of the cam, and again descends by its gravity when this action ceases.

The fifth and sixth motions consist of those by which the leaves of heddles, or harness, $s'$, and $t'$, are worked, and are as follows. The fore sides of the straps $r'$, are connected to the heddle $s'$; and their back sides to the heddle $t'$; the heddle $s'$, is connected to the treadles $u', u'$, by straps, one of which is seen at $y'$, while the heddle $t'$, which is connected above to the back portion $r''$, of the strap $r'$, is also connected by straps, one of which is seen at $z'$, to the treadles $v', v'$, which treadles have their hangers Q, Q, on the back girth of the loom. The cam K, acts upon the treadle $l'$, and this treadle is connected to the arm $n'$, of the vibrating lever on the shaft $o'$, by the rod $m'$, and by its action serves to raise the arms $p', p'$, and the strap roller $q'$, attached to them, to the position shown in the drawing. When the cam K, ceases its action on the treadle $l'$, the arms $p'$, and the strap roller $q'$, are free to descend; and while this is taking place, the cams I, I, act on their respective treadles $u', u'$, and through the agency of the straps $y', y'$, and the jacks $w'$, sink the front harness $s'$, while $t'$, remains stationary, the strap $r'$, passing around the roller $q'$, which revolves for this purpose. When the cams I, I, cease their action on their respective treadles, the cams J, J, commence theirs on the treadles $v', v'$, and through the medium of the straps $z'$, and the jacks $x'$, sink the leaf of heddles, or harness, $t'$; and this being connected to the harness $s'$, by the straps $r'$, causes the harness $s'$, to rise. As the cams J, J, are relieved from their action on their treadles, the cam K, again comes into action on its treadle $l'$, raising the strap roller $q'$, and the harness $t'$, to the position shown in Fig. 1.

The warp from which the cloth in question is to be made, is usually of two kinds of thread; that which is used to form the face is drawn through the leaves of heddles, or harness, $s'$, and $t'$, in the same way in which a web is drawn into the harness of a common loom for the purpose of weaving plain cloth. The other part of the warp, or that which is used to form the back of the cloth, is drawn one half through the males connected with the cords passing through the journal $q$, and the other half through the males connected with the cords passing through the journal $r$.

The respective motions are performed in the following order. When the loom is in that stage of its operation which is shown in Fig. 1, the trap-board U, and the journal $r$, are about to descend, and while this is taking place the trap-board T, is raised, and the harness $s'$, depressed. A thread of fine filling is now introduced, and the harness $t'$, is depressed, while the harness $s'$, is raised; another thread of fine filling is now introduced, and the harness $t'$, and the journal $q$, rise simultaneously, or nearly so; a thread of coarse filling is then introduced; the trap-board T, the journal $q$, and the harness $s'$, then descend, while the trap-board U, is raised, and a thread of fine filling again introduced; the harness $s'$, then rises, while the harness $t'$, sinks, and another thread of fine filling is passed through the warp; the harness $t'$, and journal $r$, now rise simultaneously, and a thread of coarse filling is introduced, which again leaves the loom in the position shown in Fig. 1, and ready to repeat the successive motions in the same order.

In gearing this loom, the relative motions of the cam shaft and of the lathe shaft are as one of the former to six of the latter.

I have thus, fully described the manner in which I intend, in general, to construct and arrange the respective parts of this loom, so far as its peculiar action is concerned; but, as in all instruments of this description, the arrangement may be variously modified without departing substantially from the principle, or means of operation, upon which it is dependent.

Instead of the cams that are shaped like Nos. 3, and 4, that is to say, those which act only during the introduction of one thread of filling, arms may be used, furnished with rollers on their ends, and acting on a segment piece affixed to the treadle as seen at No. 5, Fig. 3.

Figure 4:
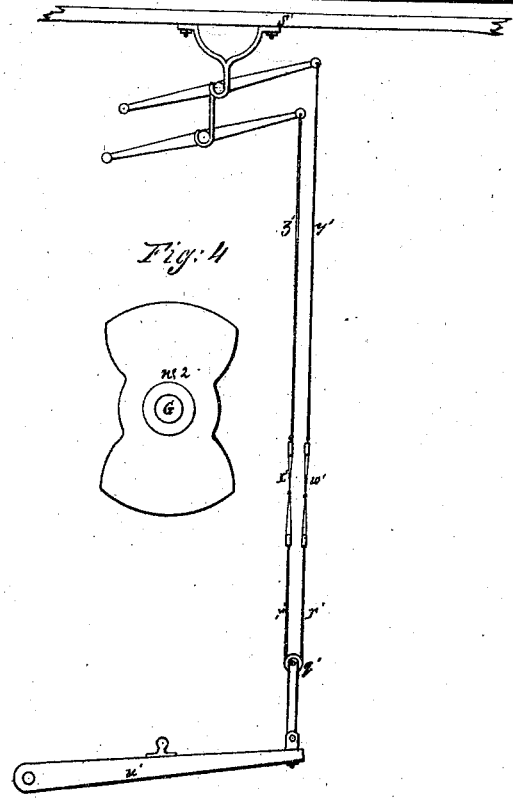
Figure 7:
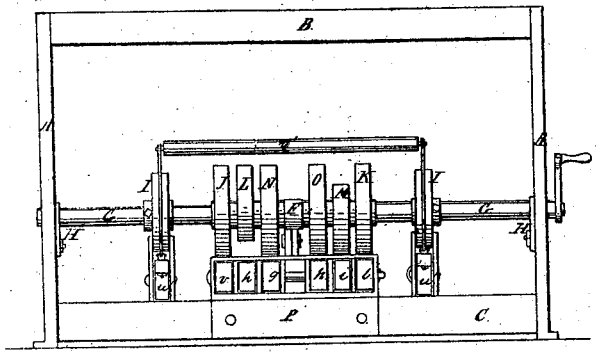

The harness roller $q'$, instead of being placed over the warp, as in Fig. 1, may be placed below it, as shown in No. 1, Fig. 4, by making the following alterations in the form and arrangement of the cams. In place of the cams I, I, J, J, and K, which act on their respective treadles $u'$, $u'$, $v'$, $v'$, and $l'$, cams formed like those shown at No. 2, in Fig. 4, drawing A, may be used, they being, in this case, arranged as shown at Fig. 7, in drawing B.

Figure 5:
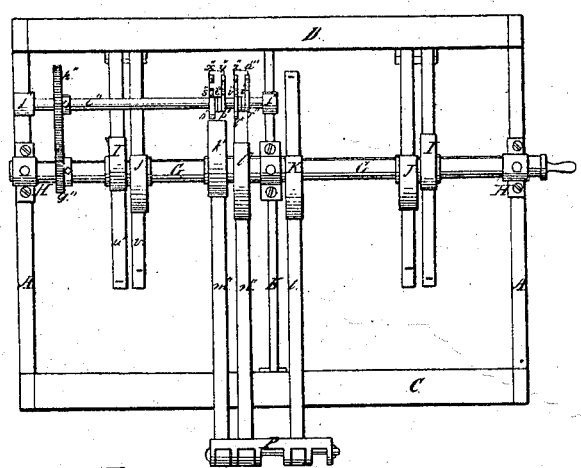
Figure 6:
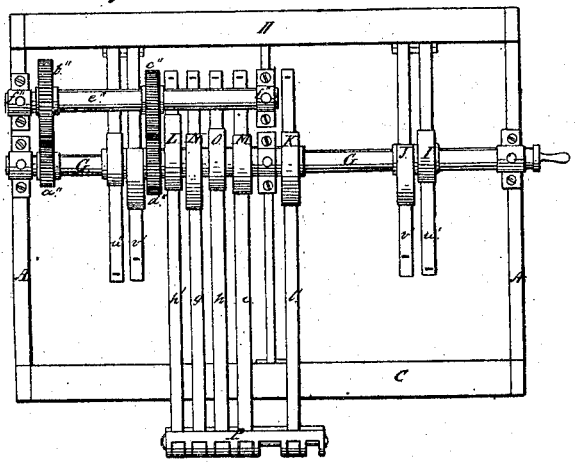

The cams for working the harness may be so arranged as to admit of the gearing of the loom in such manner as that the lathe shaft shall have three revolutions only, to one of the cam shaft. I will now describe two modes of so arranging the parts as to produce this result. The first of these is shown in Fig. 6, of drawing B; which is a plan, or top view, of the respective cams and treadles, as also is Fig. 5, in the same drawing. In Fig. 6, $a''$ is a cog-wheel made fast to the cam shaft G, which cog-wheel meshes into another cog-wheel $b''$, of twice the size of $a''$; the wheel $b''$, is fastened to a shaft $e''$, which revolves in the boxes $f''$, $f''$. A second cog-wheel $c''$, is affixed to the shaft $e''$, and this meshes into the cog-wheel $d''$, which is of the same size with $c''$. The wheel $d''$, is made fast to a hollow shaft through which the cam shaft G, passes, to which hollow shaft the cams L, N, O, and M, are also attached; and these, therefore, together with the wheel $d''$, are free to revolve upon the shaft G; said shaft will, consequently, have two revolutions, while the wheel $d''$, and the above named cams have one. The cams I, I, J, J, and K, which are employed in working the harness $s'$, and $t'$, are fastened to the shaft G, and operate in the manner already described in referring to Figs. 1, and 2, in drawing A; they, however, have but one swell, or acting part, and may be shaped like No. 2, Fig. 11, in drawing B.

The second mode of arranging the cams to which I have referred as requiring three revolutions of the lathe shaft to one of the cam shaft is as follows. Fig. 8, drawing B, is a front view, and Fig. 5, a plan of the cams, cam-shaft, &c., under this modification. The cams I, I, J, J, and K, work the leaves of harness $s'$, and $t'$ in the same manner as is described in the first, or main, arrangement, but they have each only one swell, or acting part, as in No. 2, Fig. 11, drawing B. The operation of the cams and of their appendages in working the jacquard machine, and journals, or harness-boards, $q$, and $r$, under this arrangement, is as follows. The two cams $k''$, and $l''$, are attached to the cam shaft G, and the cam $k''$, may be formed like that shown at No. 1, Fig. 11, drawing B; it being of such size as to act during the introduction of three threads of filling; the cam $l''$, may be formed like No. 2, in the same figure; it is to act during the time of introducing two threads of filling.

Fig. 9, is a side view of two of the treadles, and of certain appendages thereto. In this figure, and in Fig. 5, $s''$, $t''$, $u''$, and $v''$, are four upright treadle bars (two only, $s''$, and $u''$, of which are seen in Fig. 9) which treadle bars have hooks formed on their upper ends, as seen in Fig. 9. The bars $s''$, and $t''$, are attached by joint pins to the treadle $m''$; and $u''$, and $v''$, are in like manner attached to the treadle $n''$. These hooked treadle bars are to be acted upon so as to be forced backward by four small cams upon a shaft $i''$, which shaft revolves in bearings $j''$, $j''$; the cams upon the shaft are marked $o''$, $p''$, $q''$, and $r''$. A cog-wheel $h''$, on the shaft $i''$, meshes into a cog-wheel $g''$, which is made fast to the main cam shaft G; the wheel $g''$, is half the size of $h''$, thereby giving one revolution to the shaft $i''$, by two revolutions of the cam shaft G. The bars $s''$, $t''$, $u''$, and $v''$, are drawn toward the small cams $o''$, $p''$, $q''$, and $r''$, by the spiral springs $w''$, $w''$.

The bars $s''$, $t''$, $u''$, and $v''$, are to hook on to, and to be disengaged from, four rods furnished with hooks at their lower ends, and connected at their upper ends to the vibrating arms $e$, $f$, $f'$, and $g'$, respectively, and are to take the place, and perform the office, of the four rods $i$, $j$, $f'$, and $g'$, as shown in Fig. 1. These rods are shown in section, or top view, at $x''$, $y''$, $z''$, and $a'''$, Fig. 5, drawing B. The rod $x''$, is to be connected to the arm $e$; the rods $y''$, to the arm $f$; the rod $z''$, to the arm $f'$, and the rod $a'''$, to the arm $g'$. Two of these rods only, $x''$, and $z''$, with their corresponding treadle bars $s''$, and $u''$, are shown in Fig. 9. The hooks on the lower ends of the rods and on the upper ends of the treadle bars, are made to engage with each other by means of the small cams on the revolving shaft $i''$, in the proper order for producing the respective motions of the vibrating levers; and when these cams cease their action, the hooks are disengaged from each other by the action of the springs $w''$, $w''$.

The treadle bars may be affixed firmly to the treadles, and the rods by which they are to be made to work the respective vibrating levers may be acted upon by the small cams on the revolving cam shaft $i''$, as shown in Fig. 10, in which figure $b'''$, are springs which perform the same office with the spiral springs in Fig. 9. In other respects, the action of these bars and rods is identical. No. 1, in Fig. 10, is a guide plate, which is to be so placed as to guide and check the respective rods. This guide plate may be bolted to the back girth D, of the loom.

During the operation of the loom, the trap-board T, and the journal, or harness-board, $q$, work alternately with the trap-board U, and the journal, or harness-board, $r$; that is to say, the leaves of harness, or heddles, $s'$, and $t'$, perform their motions first in conjunction with the trap-board T, and journal, or harness-board $q$; and then said leaves of harness, or heddles, $s'$, and $t'$, repeat their motions in like manner with the trap-board U, and journal, or harness-board, $r$.

The trap-boards T, and U, are, under this last arrangement, both worked by the action of the cam $k''$, on the treadle $m''$, and the journals, or harness-boards, $q$, and $r$, are both operated by the cam $l''$, acting on the treadle $n''$.

In the above described manner of forming my loom, the movable harness-board is double, consisting of the two marked $q$, and $r$; but in the modification now to be described I use a single movable harness board, under the following arrangement.

Figure 12:
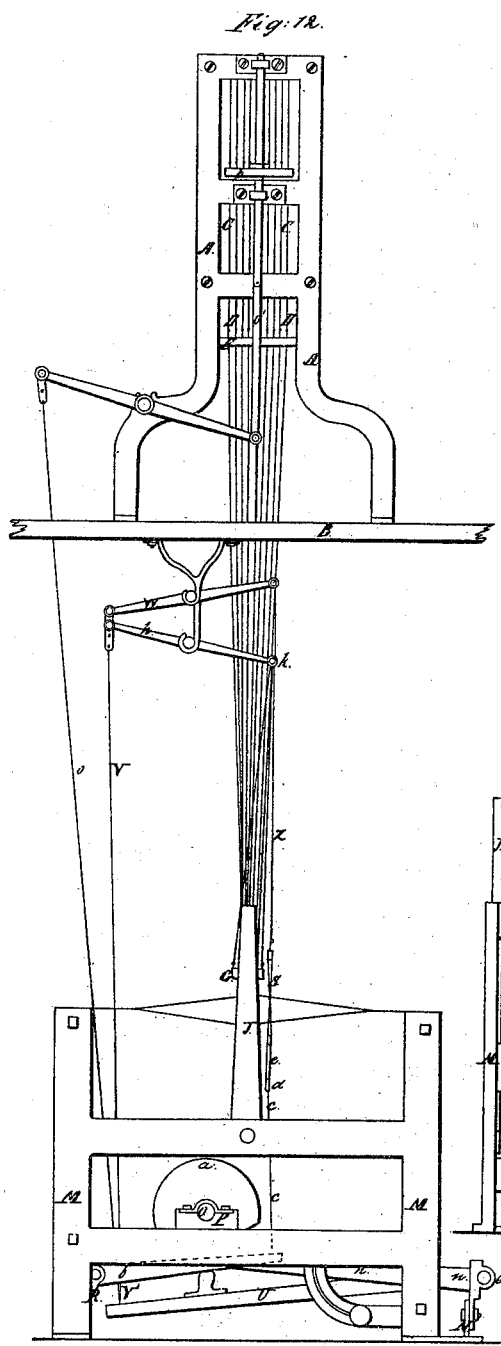
Figure 13:
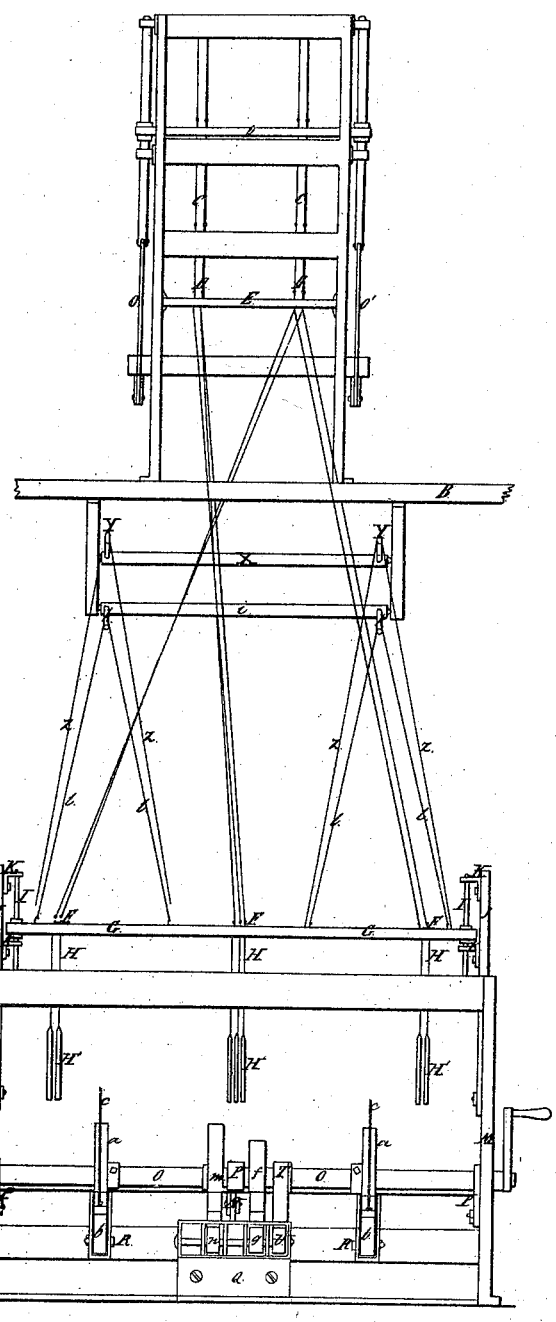

Fig. 12, in drawing C, is an end view of the machine, and Fig. 13, is a front view. In Fig. 12, A, A, is a jacquard machine, which differs but little from that in ordinary use, and it is shown as resting upon the flooring B, of the mill, above the loom. C, C, are the knot cords to which the neck of the harness is tied, at D, D; and these pass down through the heck frame E, and are tied to the male cords at F, F, Fig. 13, by a knot of a sufficient size to enable the journal, or harness-board, G, G, when it rises, to lift the male cords H, H, and the suspended weights H', H'. The harness-board, or journal G, is perforated with smooth holes of suitable size to allow the male cords H, H, to pass freely, and is guided by the guide rods I, I, in such a manner as to admit of a vertical, reciprocating motion. J, J, are stands to support the guides K, K. M, M, is the frame work of the end of the loom, and N, the cross girth which supports the middle of the main shaft O, O, to which the cams are attached. P, P, are the boxes in which said shaft revolves. Q, is the front treadle hanger, which is usually bolted to the end of the cross girth N. R, R, are also treadle hangers which are bolted to the bottom of the back girth of the loom. S, is the front harness, which is usually a single leaf of heddles; but it may consist of a series of leaves containing the requisite number of eyes; these heddles are made in the ordinary way; in Fig. 13, the harness is not represented. The working of this mounting, or harness, requires three principal motions. The first motion is that of depressing it, which is effected as follows.

The cam T, shown flatwise at No. 1, in Fig. 15, acts on the treadle U, during the introduction of one thread of filling, or woof, and, through the medium of a rod hidden by the rod V, but seen at V', works the vibrating lever W, and thereby turns the shaft X, Fig. 13, thus elevating the arms Y, Y, of the lever W; and the harness S, which is connected thereto by the rods Z, Z. When the cam T, begins to be relieved from its action, the cams $a$, $a$, which are shaped like $a$, No. 2, in Fig. 15, and which act during the introduction of two threads of filling, begin to act on the treadles $b$, $b$, and through the medium of the straps $c$, $c$, the jack $d$, and straps $e$, $e$, depress the harness S. To avoid concealing other parts, the harness S, as before remarked, is not shown in Fig. 13, but the cords, or straps, Z, Z, to which it is attached are represented.

The second motion consists in raising and depressing the journal, or harness-board, G, and is thus effected. The cam $f$, which is shaped as No. 1, in Fig. 15, and is shown at *f*, No. 3, acts during the introduction of one thread of filling, upon the treadle *g*, which communicates motion by the rod V, and the vibrating lever *h*, to the shaft *i*, Fig. 13, which, through the medium of the arms *k*, *k*, and the rods, or cords *l*, *l*, raise said harness-board G, which falls by its own gravity when the cam *f*, ceases its action.

The third motion, or that for working the jacquard machine, is effected by the cam *m*, which acts during the introduction of two threads of filling, and is shaped like that marked *a*, No. 2, in Fig. 15, and is shown at *m*, in No. 3; this acts on the treadle *n*, which communicates motion through the rod O′, to the jacquard machine which operates in the ordinary way.

To weave the fabric in question by the means herein described, one half of the chain, or warp, is drawn through the front harness S, the other half through the jacquard harness, and the motions are performed in the following order, viz: The front harness S, is raised, and a shot of fine filling is introduced; then, while said harness is sinking, both the journal, or harness-board, G, and the trap-board *p*, in the jacquard machine, are raised simultaneously, or nearly so, and a second thread of fine filling is introduced; the journal, or harness-board, G, then descends with all these threads in this shed of the warp where the filling is to be raised to form the figure, while the trap-board *p*, remains holding up those warp threads where plain cloth is required; a coarse thread of fillings is now introduced, and the trap-board then descends, and the harness S, rises as before. The cloth may be wrought with either the plain, or the figured, side up.

In the action of the jacquard machine, as above described, the cloth is supposed to be working with the figure side up. The only difference is that when the cloth is working with the figure side down, the jacquard machine holds up the threads when the figure is required, in lieu of the threads when the plain cloth is required, as in the other case.

In gearing the loom, under this modification of it, the relative motions between the lay and the cam shafts are as three of the former to one of the latter, as will be manifest from the foregoing description.

The mode of arrangement represented in the drawings, will, it is believed, answer best in practice, but the following modifications may be made, and accomplish the same end. By doubling the cams, that is, by giving two swells to each, the relative motion of the shafts would become six of the lay shaft to one of the cam shaft, and thus effect the purpose required. In lieu of the cams shaped like No. 15 in Fig. 4, an arm *q*, may extend from the cam shaft having a roller *r*, on its outer end to act upon a segment piece *s*, fastened to the treadle, as shown in Fig. 14.

The harness S, instead of being drawn down by the cams *a*, *a*, may be sunk by the means of weights, or springs, attached to the under side of it. The same may also be accomplished by the action of the jacquard cam *m*; as instead of the cams *a*, *a*, levers may be introduced in such a manner that when the jacquard cam *m*, acts, the ends of said levers, which are made to connect with the harness S, shall cause it to be depressed.

A cam shaped like T, in No. 1, Fig. 15, or the arm and roller as shown in Fig. 3, may be substituted for the jacquard cam *m*, in which case the journal, or harness-board, G, may descend before the trap-board *p*, rises, or counter weights suspended from the knot cord, to insure their proper action on the trap-board, and the weights, or springs, also, or the cams *a*, *a*, must be used to sink the harness S.

Having thus, fully described the nature of my improvements, in the loom for weaving counterpanes, and other figured articles, and having, also, set forth several different modifications thereof, and particularly in the manner of forming and arranging the cams, on the cam shafts, by which the required motion is given to the respective treadles, so as to correspond in their action with the arrangements made in the other parts of the loom, it is to be understood that I do not claim, nor do I intend to limit myself to, the particular arrangement of the cams and treadles, these not constituting a distinguishing, or an essential, feature of my improvements; these consisting, mainly, in the mounting of the loom and of tying up the harness, so as to admit of the employment of one, or more, movable harness-boards, and of one, or more leaves of heddles, and of the jacquard machine in the power loom. By this arrangement I am enabled to produce a free and open shed of the warp, and to allow one part, or shed, thereof to descend, while the other is rising.

What I claim, therefore, as constituting my invention, and which I desire to secure by Letters Patent, is—

The within described manners, or modes, of mounting the loom and tying up the harness, and of working the same, in which, under its various modifications, I combine a movable harness-board, or boards, with one, or more, leaves of heddles, or harness, and with the jacquard machine, in the power loom; such arrangement and combination being substantially the same with that herein described.

E. B. BIGELOW.

Witnesses:
 THOS. P. JONES,
 EDWIN L. BRUNDAGE.